United States Patent
Wern

(10) Patent No.: US 6,238,268 B1
(45) Date of Patent: May 29, 2001

(54) MEDIA BLASTING APPARATUS AND METHOD

(76) Inventor: Michael J. Wern, 13435 W. Regan Rd., Mokena, IL (US) 60448

( * ) Notice: Subject to any disclaimer, the term of this patent is extended or adjusted under 35 U.S.C. 154(b) by 0 days.

(21) Appl. No.: 09/393,457

(22) Filed: Sep. 10, 1999

Related U.S. Application Data
(60) Provisional application No. 60/099,996, filed on Sep. 11, 1998.

(51) Int. Cl.$^7$ ....................................................... B24C 3/00
(52) U.S. Cl. ............................... 451/36; 451/75; 451/87; 451/99
(58) Field of Search ........................... 451/75, 36, 87–89, 451/99

(56) References Cited

U.S. PATENT DOCUMENTS

| | | |
|---|---|---|
| 2,352,857 | 7/1944 | Nachemov . |
| 2,420,759 | 5/1947 | Stelz . |
| 2,725,685 | 12/1955 | Hill . |
| 3,419,894 | 12/1968 | Burney et al. . |
| 3,423,976 | 1/1969 | Burney et al. . |
| 3,613,424 | 10/1971 | Normos . |
| 4,167,864 | 9/1979 | Taipale . |
| 5,107,630 * | 4/1992 | Lodewijk ............................ 451/75 X |
| 5,216,848 * | 6/1993 | Abbott et al. ....................... 451/75 X |
| 5,251,468 | 10/1993 | Lin et al. . |
| 5,272,897 | 12/1993 | Wern . |
| 5,503,591 * | 4/1996 | Morikawa et al. ..................... 451/75 |
| 5,599,223 | 2/1997 | Mains, Jr. . |
| 5,709,587 | 1/1998 | Shaffer . |
| 5,879,223 * | 3/1999 | Frederick et al. ................. 451/75 X |

FOREIGN PATENT DOCUMENTS

| | | |
|---|---|---|
| 56-76306 | 6/1981 | (JP) . |
| 1271175 | 10/1989 | (JP) . |
| 873930 | 3/1996 | (JP) . |

OTHER PUBLICATIONS

Empire Abrasive Equipment Corporation, Jun. 1979.*

* cited by examiner

Primary Examiner—Joseph J. Hail, III
Assistant Examiner—Anthony Ojini
(74) Attorney, Agent, or Firm—Barnes & Thornburg

(57) ABSTRACT

An improved method and apparatus for media blasting a workpiece 20 is described. The media blasting apparatus 10 of the present invention includes a media reclaim and recycle system 35, which reduces media wastage, advantageously improves peening of a workpiece 20 and provides better coverage of the workpiece surface. The media blasting apparatus 10 also includes a pressure chamber 90 for creating a media blast stream, a media metering valve 105 for controlling media flow rate and a powered part hold-down apparatus 130 for holding the workpiece 20 in a predetermined position during a blasting operation. The controlled media flow rate in combination with the powered hold down of the workpiece 20 ensures even and thorough peening of a workpiece surface.

12 Claims, 3 Drawing Sheets

MEDIA BLASTING APPARATUS AND METHOD

CROSS REFERENCE

This patent application claims the benefit of domestic priority of co-pending U.S. Provisional App. Ser. No. 60/099,996, filed Sep. 11, 1998.

BACKGROUND OF THE INVENTION

This invention relates generally to a method and apparatus for media blasting and more specifically relates to an improved method and apparatus for media blasting a workpiece or part. This invention uses the powered part holddown apparatus of U.S. Pat. No. 5,272,897, the disclosure of which is hereby incorporated by reference.

In the finishing of machined or fabricated parts or workpieces, the use of media blasting or peening to increase the fatigue strength of a workpiece or part is well known. An example of such a part is a gear utilized in automobile transmissions. Once these gears are formed, they should be processed by media blasting machines and the like to ensure that the gears meet government and manufacturer specifications, as well as to ensure that the gears are suitable for performing their intended functions.

Usually, the workpiece or part is placed in a closed chamber, in which a blasting means or a blasting system is located. A typical blasting system is a suction type system, which includes a media feed hose and an air supply hose interconnected at a suction gun. When the blasting system is actuated, the suction gun is turned on. This, in turn, causes media to be drawn from a storage hopper and into the media feed hose. The media are drawn through the media feed hose to the suction gun, where the media are then mixed with air from the air supply hose. After mixing of the media and air, the suction gun directs a stream of the air/media mixture against the workpiece, to provide compression stress to the surface by means of the colliding media.

Media blasting operations/systems of this type have a number of problems. Although media blasting strengthens the workpiece, it may also roughen the surface of the workpiece and/or result in an uneven surface finish. Surface roughness or an uneven surface finish decreases the hardness of the workpiece and can interfere with its intended function. For example, surface roughness or uneven surface finish in a gear interferes with the ability of the gear to mesh. Moreover, a workpiece having an uneven surface finish is susceptible to crack propagation, which can result in workpiece failure. Thus, it is important that the surface finish be evenly dimpled with a uniform distribution of peaks and valleys, as an uneven distribution contains deeper valleys which can propagate as cracks.

A further problem with media blasting operations/systems of this type result from the use of suction means to provide the media blast stream. As discussed above, in media blasting or shot peening operations, the dimple formation on the workpiece must be carefully controlled. In regulating dimple formation, the velocity of the media is an important control parameter. However, with suction guns it is difficult to control the flowrate of the media blast stream. It is also difficult to adjust the flowrate when changing from use of one type of media to another type, as the air velocity and media flow rate cannot be adjusted independently. Moreover, in a suction gun the media and air are mixed immediately prior to ejection, which may not allow the media to develop sufficient velocity to provide desired compressive stress.

Prior art methods have attempted to solve the problems of surface roughness or uneven surface finish by using glass beads. Although glass beads tend to reduce surface roughness, they may not sufficiently increase the fatigue strength of the workpiece. A further problem with this and other prior art methods is the difficulty of obtaining even peening of the workpiece surface. This problem arises, in part, from the lack of directivity of the media. Prior art methods also suffer from a high wastage of media, due to attrition of the media during the blasting process. The high wastage of media reduces both the operational efficiency and cost-effectiveness of a blasting operation.

Japanese patent application number H6-217214, entitled "A Strengthening Method For Metal Parts," filed Sep. 12, 1994, in the name of Honda Motor Company, Ltd., describes a media blasting method which attempts to alleviate some of the above mentioned problems. This Japanese application describes a metal strengthening method in which a stream of water and glass beads is directed toward a metal part. Use of water as a suspending medium imparts directivity to the glass beads. It also provides additional compression stress and provides a polishing effect.

Although use of water improves the surface smoothness of the workpiece and the directivity of the media, it introduces additional problems without addressing the problem of media wastage or media flow control. In particular, use of wet media complicates design of the media blasting system, because all the parts of the media blasting system have to be designed for the presence of water. For example, care must be taken to avoid creating an electrolytic junction. Use of water also limits the type of workpieces that can be processed and the type of media which can be blasted. For example, it would be undesirable to use this method with a workpiece which is susceptible to corrosion.

Accordingly, a media blasting apparatus and method according to the teachings of the present invention is intended to solve problems inherent in the prior art media blasting systems discussed above, as well as others. A media blasting system and method according to the present invention increases operational efficiency, reduces media wastage and media use, provides even peening of a workpiece surface, provides a polishing effect or an even surface finish, and, moreover, obviates use of a high directivity media stream.

OBJECTS AND SUMMARY OF THE INVENTION

A general object of the present invention is to provide a media blasting apparatus and method which provides improved workpiece peening.

Another object of the present invention is to provide a media blasting apparatus and method which reduces media use and wastage.

An additional object of the present invention is to provide a media blasting apparatus and method which obviates use of a high directivity media stream.

A further object of the present invention is to provide a media blasting apparatus and method which allows control of media flow rate by using a pressurized system.

Yet another object of the present invention is to provide a media blasting apparatus and method which provides even peening of a workpiece surface and a uniform surface finish.

An additional object of the present invention is to provide a media blasting apparatus and method which provides effective peening of hard-to-reach surfaces of a workpiece.

Further objects and advantages of the present invention will become apparent from a consideration of the drawings and ensuing description.

Accordingly, the present invention provides a media blasting apparatus in which a workpiece to be treated is held in a predetermined position during processing by the powered part hold-down apparatus of U.S. Pat. No. 5,272,897 and including a media reclaim and recycle system. The present invention also provides a media blasting method in which a smaller mass flow rate of media is blasted at higher velocity and for a longer time than in prior art methods to produce desired results.

BRIEF DESCRIPTION OF THE DRAWINGS

The present invention will now be described, by way of example, with reference to the accompanying drawings in which.

DETAILED DESCRIPTION OF A PREFERRED EMBODIMENT

Figure 1:
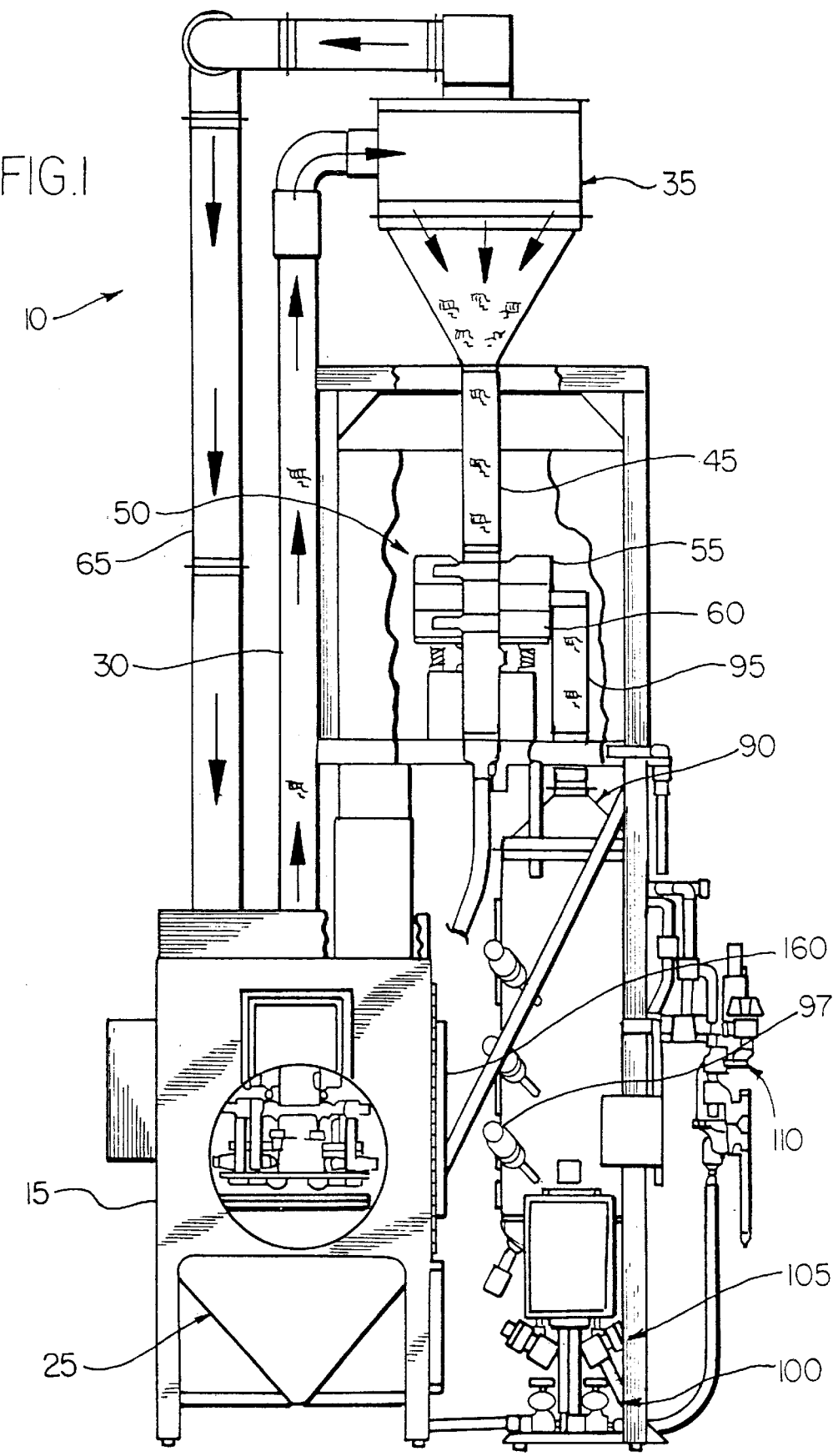
FIG. 1 is a front elevational view of a media blasting apparatus for treating a workpiece according to the invention.
Figure 2:
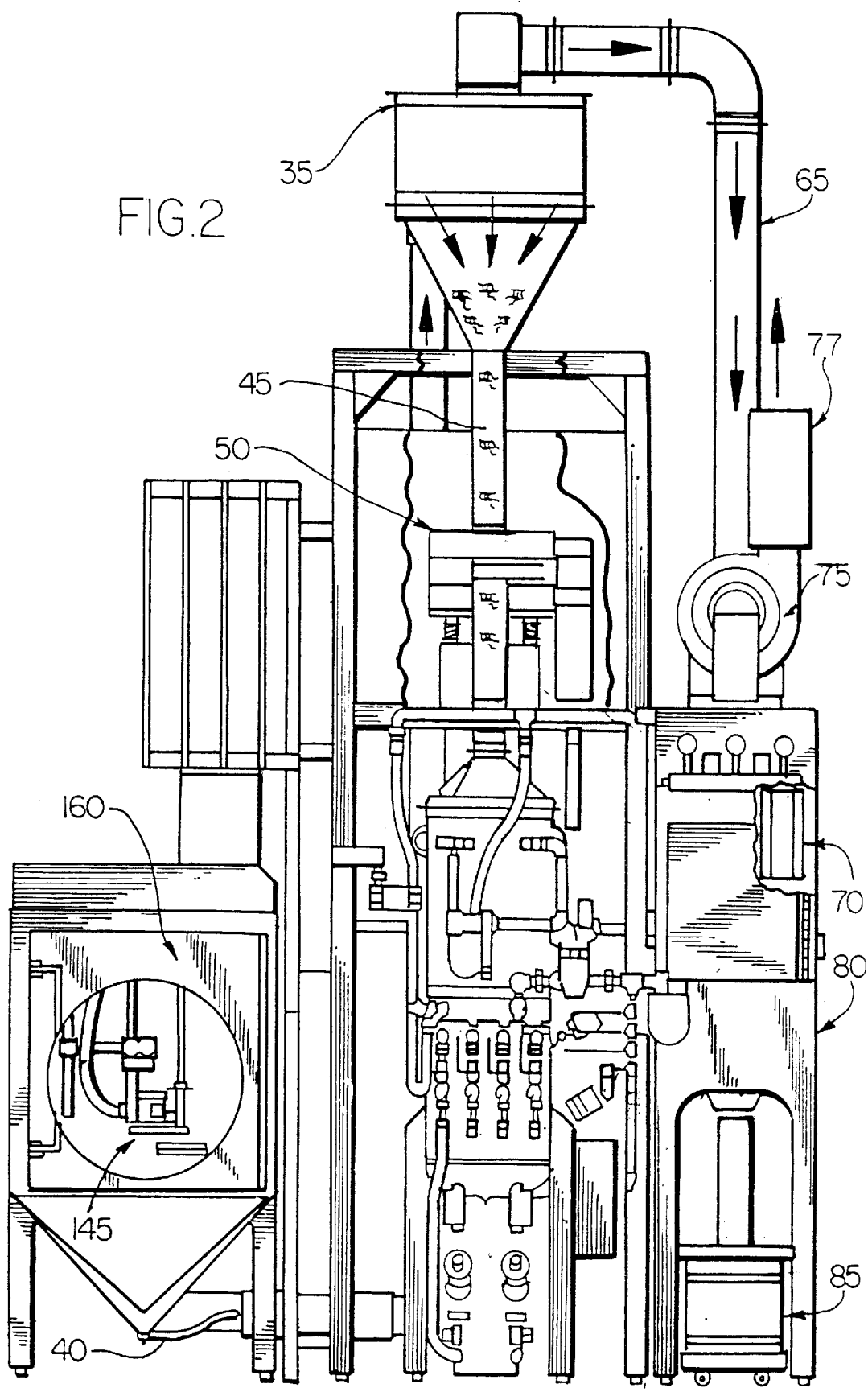
FIG. 2 is a right-side elevational view of the media blasting apparatus for treating a workpiece according to the invention.

Referring now to the drawings, FIG. 1 shows a front view of a media blasting apparatus according to the invention, generally indicated by the number 10. As illustrated, the media blasting apparatus 10 includes a blasting cabinet or chamber 15, in which a stream of media is directed against a workpiece 20. Such media may comprise, for example, glass, ceramic or fine steel beads. The cabinet 15 is connected to a cabinet media hopper 25 for collecting the media that fall after collision with the workpiece 20. The fallen media will include broken pieces of media which have been recycled, as well as virgin or unbroken pieces. A conduit 30 connects the cabinet media hopper 25 to a media reclaim system, generally indicated by the number 35. As best illustrated in FIG. 2, the cabinet media hopper 25 is also connected to air supply means 40. The air supply means 40 provides air flow to the cabinet media hopper 25, for forcing the collected fallen media up through the conduit 30 to the media reclaim system 35.

As illustrated in FIGS. 1 and 2, the media reclaim system 35 includes a conduit 45 for conveying collected media to separation means 50. The separation means 50 is a two-deck system comprising a top screen 55 and a bottom screen 60. In a preferred embodiment of the present invention, the top screen is 40 mesh gauge and the bottom screen is 150 mesh gauge. The separation means 50 generally separates the fallen media into unbroken media and broken media of sufficiently large size to be recycled for use in the blasting operation and fines or dust which cannot be reused. The separator screens 55 and 60 are constantly vibrated to increase the efficiency of separation.

The media reclaim system 35 also includes a conduit 65. Conduit 65 is connected to a filter system 70 and to a blower-motor system 75. In a preferred embodiment, the blower-motor system 75 includes a blower muffler 77 for noise reduction. The blower-motor system 75 draws air from conduit 65, creating an upward draft in conduit 45 which carries the fines/non-reusable media from the separation means 50 up through conduit 45 into conduit 65 and into the filter system 70. The filter system 70 is connected to a dust collector 80 for collecting the fines and broken media. These are collected into a drum 85, which is periodically removed and emptied. In a preferred embodiment, the drum 85 is adapted to be rolled away and emptied. For example, the drum 85 may be coupled to a dolly.

As illustrated in FIG. 1, the separation means 50 is connected to a double pressure chamber 90 via a conduit 95. A media path is defined between the cabinet media hopper 25 and the pressure chamber 90. In a preferred embodiment, the double pressure chamber is held between 70 and 80 psi. The conduit 95 delivers the reclaimed reusable media to the double pressure chamber 90 where the reclaimed and reusable media are mixed with virgin media. In a preferred embodiment, the reclaimed media are of a mesh size greater than 10 mesh and the virgin media are of a mesh size greater than 60–80 mesh. As stated previously, in the present invention, the media may comprise glass, ceramic, or fine steel beads. The virgin media are supplied to the double pressure chamber 90 through a plurality of media supply valves 97. The double pressure chamber 90 is also coupled to a media sensor monitor 100 for automatically controlling the supply of the virgin media. The supply of the virgin media is controlled to ensure adequate peening of the workpiece. Specifically, the supply of the virgin media is controlled to ensure that adequate compression stress is provided to the workpiece 20 so that a sufficiently high fatigue strength is obtained.

Advantageously, the double pressure chamber 90 also includes an automatic media metering on/off valve 105. The automatic media metering on/off valve 105 regulates the supply of the virgin/recycled media mixture to an air/media mix point, where the media are suspended in air. An automatic air valve 110 is coupled to the double pressure chamber 90 for suspending the media in air at the air/media mix point and then conveying the suspended media to the blasting cabinet 15 via blasting hoses 115.

The automatic metering on/off valve 105 in the present invention allows improved control of the media flow rate, as the media supply and air supply can be independently controlled. The presence of the automatic metering on/off valve 105 in the present invention is made possible by the use of a pressurized blasting system, rather than a suction type system, to deliver the media. In a suction type system, suction force is relied on to draw media from a media supply, through a media supply hose, to the suction gun. The presence of a metering valve 105 in a suction system, however, would reduce the pressure drop in the media supply hose causing a reduction in the suction force. The reduced suction force would, in turn, interfere with the delivery of media. The present invention, on the other hand, is a pressure driven system and so positive pressure can be relied on to force media through the media metering valve 105 to the media mix point.

A further advantage of the pressurized system of the present invention is that it helps ensure an adequate media velocity is obtained. As mentioned above, media velocity is an important control parameter in ensuring that sufficient compressive stress is provided to a workpiece 20. The pressurized system of the present invention helps ensure an adequate media velocity through control of the media flow rate and through the positioning of the air/media mix point. The media flow rate is controlled through the media metering valve 105. The air/media mix point is located sufficiently far from the blast hose so that the media have time to develop a desired or adequate velocity.

Figure 4:
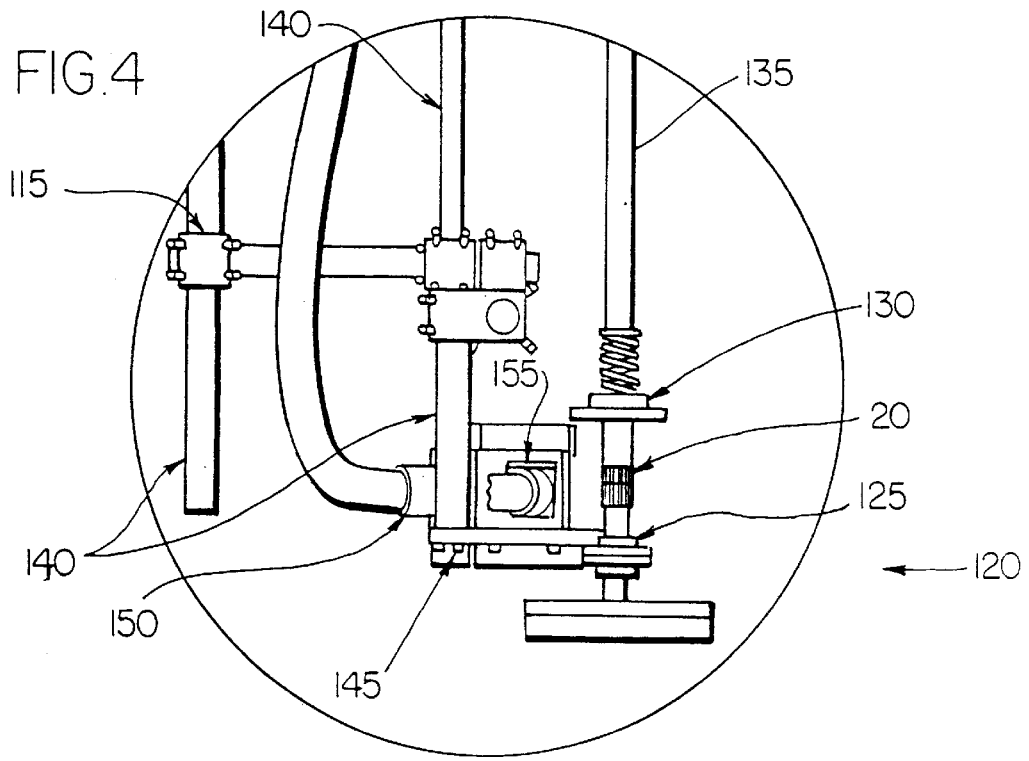
FIG. 4 is an enlarged, partial fragmentary, side elevational view of a blast station of the media blasting apparatus for treating a workpiece according to the invention.

A blasting station 120 inside the blasting cabinet 15 will now be described. As illustrated in FIG. 4, the workpiece 20 to be processed, i.e., blasted with media, is mounted on a part holder 125. Preferably, the part holder 125 has been hardened. The workpiece 20 is held in a predetermined position by a powered part hold-down apparatus 130. In the present invention, the powered part-hold-down apparatus 130 is that described in U.S. Pat. No. 5,272,897, to which reference is again invited. The subject matter of U.S. Pat. No. 5,272,897 is incorporated herein by reference. The patented powered part-hold-down apparatus 130 provides variable, compensating, cushioned clamping for maintaining the workpiece 20 in the predetermined position during media blasting. The device as taught in U.S. Pat. No. 5,272,897 is very important to facilitate processing high volume quantities of parts. This is especially important for parts such as gears which tend to rotate when peened since the hold-down device prevents free spinning of the parts. The hold-down device also controllably rotates the parts at a desired rate of rotation. Rotation of the powered part-hold-down apparatus 130 is provided via a rotatable shaft 135.

Figure 3:
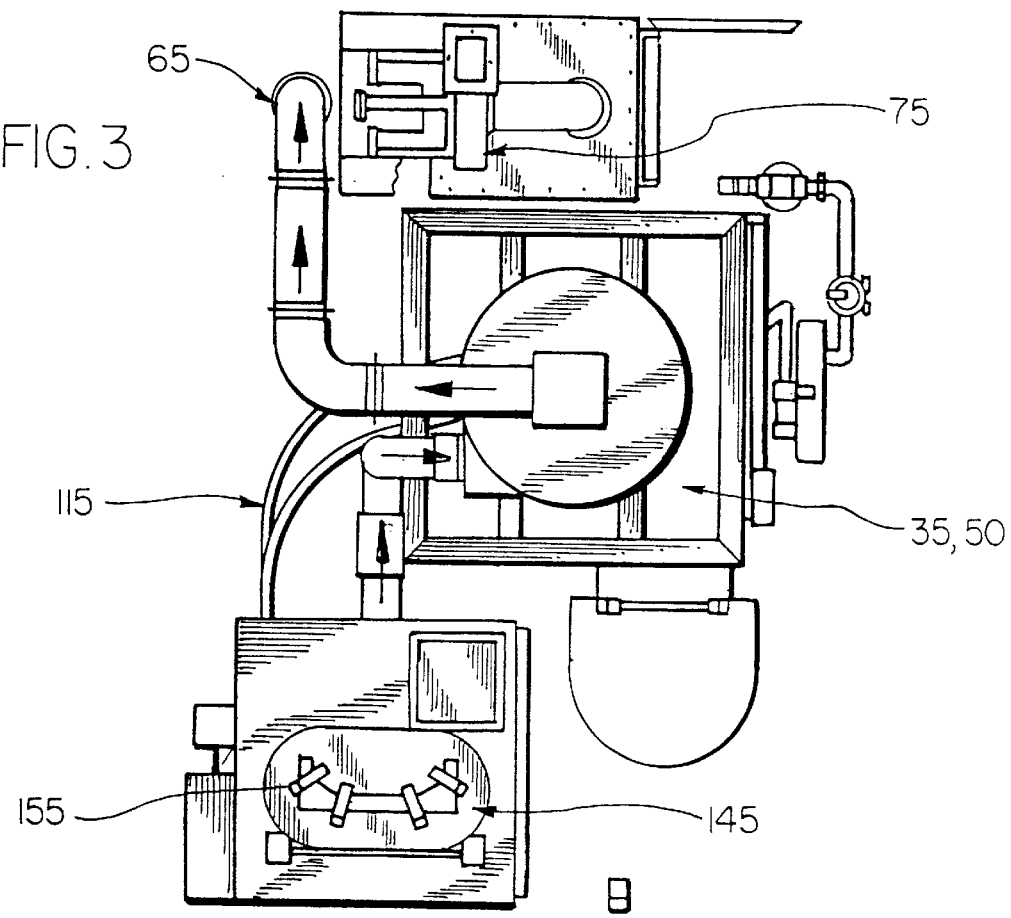
FIG. 3 is a top plan view of the media blasting apparatus for treating a workpiece according to the invention.

Hardened rods 140, preferably steel, provide a support system for a gun-rack assembly 145. The gun-rack assembly 145 holds a nozzle holder 150. A blast nozzle 155, to which the blasting hoses 115 are connected is attached to nozzle holder 150. The blast nozzle 155 directs a stream of media, suspended in air, against the surface of the workpiece 20. Preferably, the blast nozzle is positioned between approximately four to eight inches away from the workpiece 20. Although, only one blast nozzle 155 is illustrated in FIG. 4, it will be understood to those skilled in the art that a plurality of blast nozzles 155 could be used. In a preferred embodiment of the present invention, four such blast nozzles 155 are located in the blasting cabinet 15, as shown in FIG. 3. The blasting cabinet 15, containing the part-hold-down apparatus 130 and blasting apparatus is also provided with a door 160 for installation of a new workpiece 20.

The operation of the present invention will now be described. After a workpiece 20 is placed in the part-hold-down apparatus 130, door 160 is closed. A stream of media suspended in air is then directed against the workpiece 20 by the blast nozzle 155. As the media are blasted, the workpiece is controllably rotated by the powered patented part-hold-down apparatus 130. This controlled rotation ensures even peening of the surface of the workpiece 20 and obviates use of a high directivity stream of media, hence making the use of water-supported media unnecessary.

The powered part-hold-down apparatus is preferably rotated at between 8–12 rpm. A rate of rotation of 10 rpm, however, has been found to be particularly effective for treatment of gears. The rate of rotation can be related to the degree of peening required and to the evenness of dimpling on the resulting surface. A slow controlled rotation permits even peening with uniform small dimpling and prevents the media stream from striking the surface unevenly, resulting in indentations that could act as crack precursors. Thus, for example, if the workpiece 20 is a gear, the controlled rotation ensures that media, e.g. ceramic, fine steel, or glass beads, are directed towards the root and tooth face of the gear during the course of the rotation. By ensuring even peening, the operational characteristics of the workpiece 20 are improved.

In the preferred embodiment of the present invention, a smaller mass flowrate of media is blasted at higher velocity and for a longer time than in the prior art methods. The preferred flowrate depends on the type and size of media used, as well as the particular application involved. For treatment of gears, we have found a media flowrate of approximately 1.5–3 lb/minute to be effective. Of course, other flowrates could be used, depending on the results desired. This flowrate was found to be effective with glass media, ceramic media, and fine steel media of mesh size falling in the range of 50–100 mesh. In a preferred embodiment of the present invention, however, 60–100 mesh glass media are used. When 60–100 mesh glass media were used to treat gears, a marked improvement in the operational characteristics of the gears was observed. The choice of media to be used depends upon the application and the relative economics. Ceramic and steel media last longer than glass; however, these media are more expensive.

After the media collide with the workpiece 20 they fall into the cabinet media hopper 25 and are then conveyed to the reclaim system 35. The reusable media are separated from the fines and dust and are returned to the blasting station 120 after mixing with virgin media. Such mixing reduces media wastage. The reuse of partially broken media also improves the polishing effect of the media upon the workpiece 20.

Thus, an improved method and apparatus for the media blasting of a workpiece have been described. The method and apparatus of the present invention reduce media wastage through use of a novel media reclaim and recycle system. Use of recycled media has the additional advantageous effect of improving polishing of a workpiece.

The present invention also ensures even peening and a uniform surface finish through use of the patented powered part hold-down apparatus, described in U.S. Pat. No. 5,272,897, and obviates use of a high directivity media stream and its associated complications. Improvements in peening and surface finish are also provided in the present invention by use of a pressurized system to create and deliver the media blast stream. The present invention, moreover, reduces media use, by blasting a smaller mass flow rate of media at higher velocity and for longer periods of time than in conventional methods.

What is claimed is:

1. A method of processing a work piece in a peening process with a media blasting stream comprising the steps of:
   providing a pressurized blasting system;
   directing a recycled media mixture at a work piece, said recycled media mixture comprising a mixture of virgin media and recycled media which have been used in a previous blasting operation;
   collecting said blasting media;
   separating said blasted media into media of a predetermined range of sizes for reuse in further blasting operations and media of a size insufficient for reuse in further blasting operations;
   monitoring a supply of virgin media;
   regulating introduction of virgin media in relation to a supply of said blasted media; and
   mixing said predetermined size range blasted media with virgin media to produce a recycled media mixture for use in processing a work piece.

2. A method of processing a work piece in a peening process with a media blasting stream as recited in claim 1, further comprising the steps of:
   controlling introduction of virgin media so that a recycled media mixture includes a predetermined quantity of virgin media.

3. A method of processing a work piece in a peening process with a media blasting stream as recited in claim 1, further comprising the steps of:

pressurizing said system from between approximately 70 psi and approximately 80 psi.

4. A method of processing a work piece in a peening process with a media blasting stream as recited in claim 1, further comprising the steps of:

providing virgin media and recycled media in the form of glass beads.

5. A method of processing a work piece in a peening process with a media blasting stream as recited in claim 1, further comprising the steps of:

providing a first screen spaced from a second screen contained in the pressurized system for separating said blasted media into media of a predetermined range of sizes for reuse in further blasting operations and media of a size insufficient for reuse in further blasting operations.

6. A method of processing a work piece in a peening process with a media blasting stream as recited in claim 1, further comprising the steps of:

providing a first screen of approximately 30 mesh gauge spaced from a second screen of approximately 200 mesh gauge contained in the pressurized system for separating said blasted media into media of a predetermined range of sizes for reuse in further blasting operations and media of a size insufficient for reuse in further blasting operations.

7. A method of processing a work piece in a peening process with a media blasting stream comprising the steps of:

providing a pressurized blasting system;

positioning a work piece in a part holder contained in the pressurized blasting system, said part holder providing a variable compensating cushioned clamping of the work piece for maintaining the work piece in a predetermined position during a blasting operation;

directing a recycled media mixture at said work piece, said recycled media mixture comprising a mixture of virgin media and recycled media which have been used in a previous blasting operation;

monitoring a supply of virgin media;

controlling introduction of virgin media in relation to a supply of said recycled media; and collecting said blasted recycled media mixture for reuse in a subsequent blasting operation.

8. A method of processing a work piece in a peening process with a media blasting stream as recited in claim 7, further comprising the steps of:

controlling introduction of virgin media so that a recycled media mixture includes a predetermined quantity of virgin media.

9. A method of processing a work piece in a peening process with a media blasting stream as recited in claim 7, further comprising the steps of:

pressurizing said system from between approximately 70 psi and approximately 80 psi.

10. A method of processing a work piece in a peening process with a media blasting stream as recited in claim 7, further comprising the steps of:

providing virgin media and recycled media in the form of glass beads.

11. A method of processing a work piece in a peening process with a media blasting stream as recited in claim 7, further comprising the steps of:

providing a first screen spaced from a second screen contained in the pressurized system for separating said blasted media into media of a predetermined range of sizes for reuse in further blasting operations and media of a size insufficient for reuse in further blasting operations.

12. A method of processing a work piece in a peening process with a media blasting stream as recited in claim 7, further comprising the steps of:

providing a first screen of approximately 30 mesh gauge spaced from a second screen of approximately 200 mesh gauge contained in the pressurized system for separating said blasted media into media of a predetermined range of sizes for reuse in further blasting operations and media of a size insufficient for reuse in further blasting operations.

* * * * *